(12) United States Patent
Warner et al.

(10) Patent No.: US 7,676,199 B2
(45) Date of Patent: Mar. 9, 2010

(54) IMPEDANCE CONTROL FOR SIGNAL INTERFACE OF A NETWORK NODE

(75) Inventors: Edward J. Warner, San Diego, CA (US); Raed V. Moughabghab, San Diego, CA (US); Michael W. Landry, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 1 day.

(21) Appl. No.: 11/960,670

(22) Filed: Dec. 19, 2007

(65) Prior Publication Data

US 2008/0150585 A1 Jun. 26, 2008

Related U.S. Application Data

(60) Provisional application No. 60/870,847, filed on Dec. 20, 2006.

(51) Int. Cl.
*H04B 1/44* (2006.01)
(52) U.S. Cl. .............................. 455/78; 455/83; 455/73
(58) Field of Classification Search .................. 455/78, 455/82–84, 280–282, 289–290, 193.1, 120–121; 326/30, 26, 81–83, 86–87; 327/108–109
See application file for complete search history.

(56) References Cited

U.S. PATENT DOCUMENTS

| | | | |
|---|---|---|---|
| 4,486,723 A | 12/1984 | Lysobey | |
| 5,901,172 A | 5/1999 | Fontana et al. | |
| 6,026,280 A * | 2/2000 | Yokomura | 455/78 |
| 6,526,263 B1 * | 2/2003 | Saito | 455/78 |
| 6,643,497 B1 * | 11/2003 | Kouyama | 455/83 |
| 6,735,418 B1 * | 5/2004 | MacNally et al. | 455/78 |
| 6,845,126 B2 * | 1/2005 | Dent et al. | 375/219 |
| 6,934,557 B2 * | 8/2005 | Sekine et al. | 455/550.1 |
| 6,992,501 B2 | 1/2006 | Rapport | |
| 6,993,297 B2 * | 1/2006 | Smith, Jr. | 455/82 |
| 7,283,793 B1 * | 10/2007 | McKay | 455/83 |

* cited by examiner

*Primary Examiner*—Vibol Tan
*Assistant Examiner*—Christopher Lo
(74) *Attorney, Agent, or Firm*—Townsend and Townsend and Crew LLP (57) ABSTRACT

The terminating impedance of a networked device in a wired communication channel is controlled to avoid an impedance discontinuity when power is applied and removed from the node or other event occurs that would change the impedance of the signal interface. When the node transmits or receives signals using the communication channel, the transmit or receive device presents a matched termination to the channel. When power is removed or the device is reset, the transmit and receive circuitry is not operational and the matched impedance is therefore maintained by a separate device. The impedance may be varied slowly from a match to a high impedance to allow other devices in the network to adapt to the change in multipath environment that results from the impedance change. Alternatively, the signal interface can be switched to a passive static impedance that is maintained while power is off or the disrupting event occurs.

1 Claim, 6 Drawing Sheets

IMPEDANCE CONTROL FOR SIGNAL INTERFACE OF A NETWORK NODE

CROSS REFERENCES TO RELATED APPLICATIONS

This application claims the benefit of U.S. Provisional Application No. 60/870,847 filed Dec. 20, 2006, hereby incorporated by reference herein in its entirety.

BACKGROUND

1. Field

The invention relates to wired communication systems and specifically to controlling the impedance of an electrical signal interface of a network.

2. Background

Consider several communication nodes that are part of the same coaxial cable network or other wired network. Each node connecting to the network presents an impedance at the point of connection. Mismatches between the impedance of the node and the impedance looking into the network cause reflections. Such reflections cause a multipath signal environment that impairs passage of the signal over the medium. The input and output of the nodes include active circuitry that changes its impedance when power is applied and removed. The impedance can also change when other events occur. For example, a reset of a node can temporarily deactivate circuitry. If the nature of the reflections is known, compensation can be provided. However, as the reflections change, the compensation must change also. Adaptation to such changes takes time to complete. Sub-optimal compensation of the changed environment can cause degradation in the performance of the network, including a reduction in link margins and an increase in the data error rate.

Accordingly, it is desirable to ensure that the communication channel and other operational nodes of the network are not disturbed when power is applied to, or removed from one or more nodes or when another event changes the impedance that the node presents to the network.

SUMMARY OF THE INVENTION

The presently disclosed method and apparatus controls the impedance that a node presents to a network to minimize or avoid disruptions to signals communicated over the network. More specifically, the presently disclosed method and apparatus controls the impedance presented to a network by a node when power is applied to, or removed from the node or when the node experiences a reset or other event that changes the impedance.

In one embodiment, an Impedance Control Device is used in conjunction with a "Transitioning Node". A Transitioning Node is any node on the network for which the impedance that the node presents to the network is changing. The Impedance Control Device will typically be placed between the Transitioning Node and the network to alter the impedance presented by the Transitioning Node to the network. Changes to the impedance of the Transitioning Node may be due to power being applied, removed or due to any other condition that will change the impedance presented to the network, such as a reset.

The impedance of the Impedance Control Device causes the impedance presented to the network to slowly transition so the other nodes in the network (some of which may also be transitioning) will have time to adjust to the effect that the change in the impedance of the Transitioning Node has on the network. The other nodes in the network can adapt their modulation type, signal equalization, bit loading, or they can use any other compensation mechanism used to compensate for reflections caused by mismatched impedances in the network. Examples of such compensation include using various well-known techniques suitable for the modulation type used. The rate of the slow transition is dependent on the rate of adaptation. In another embodiment, the impedance presented to the network is held constant or nearly constant during an event by switching an interface between the Transitioning Node and the network away from the Transitioning Node and to a circuit within the Impedance Control Device which has a similar impedance which is held stable.

Power Transition Impedance Control

For a power down transition 1) the Impedance Control Device detects that the main power source has been removed. 2) The Impedance Control Device immediately switches to cause a circuit having a variable impedance to be presented to the network. The initial state of the variable impedance device is an impedance that is matched to the impedance presented by the Transitioning Node when the Transitioning Node has had power applied for a long enough time for its impedance to be stable. 3) Using some energy that was stored when the device was last powered on, slowly increase the impedance of the variable impedance circuit until the stored energy is depleted and the variable impedance circuit is at maximum impedance.

For a power up transition 1) a variable impedance device within the Impedance Control Device is placed in series with the Transitioning Node. 2) When the Impedance Control Device detects that the main power source has been applied, the Impedance Control Device sets the variable impedance device to the maximum impedance. Preferably, the Transitioning Node has been powered off long enough to cause its impedance to be very high. However, if the device is powered on or off before a given transition is fully complete, the new transition direction can increase (or decrease) the impedance from the intermediate impedance the Impedance Control Device last had. 4) Based on a timing circuit within the Impedance Control Device, the variable impedance circuit changes to a minimum impedance allowing time for the Transitioning Node in series with the variable impedance circuit to reach its operating impedance

DETAILED DESCRIPTION

Figure 1:
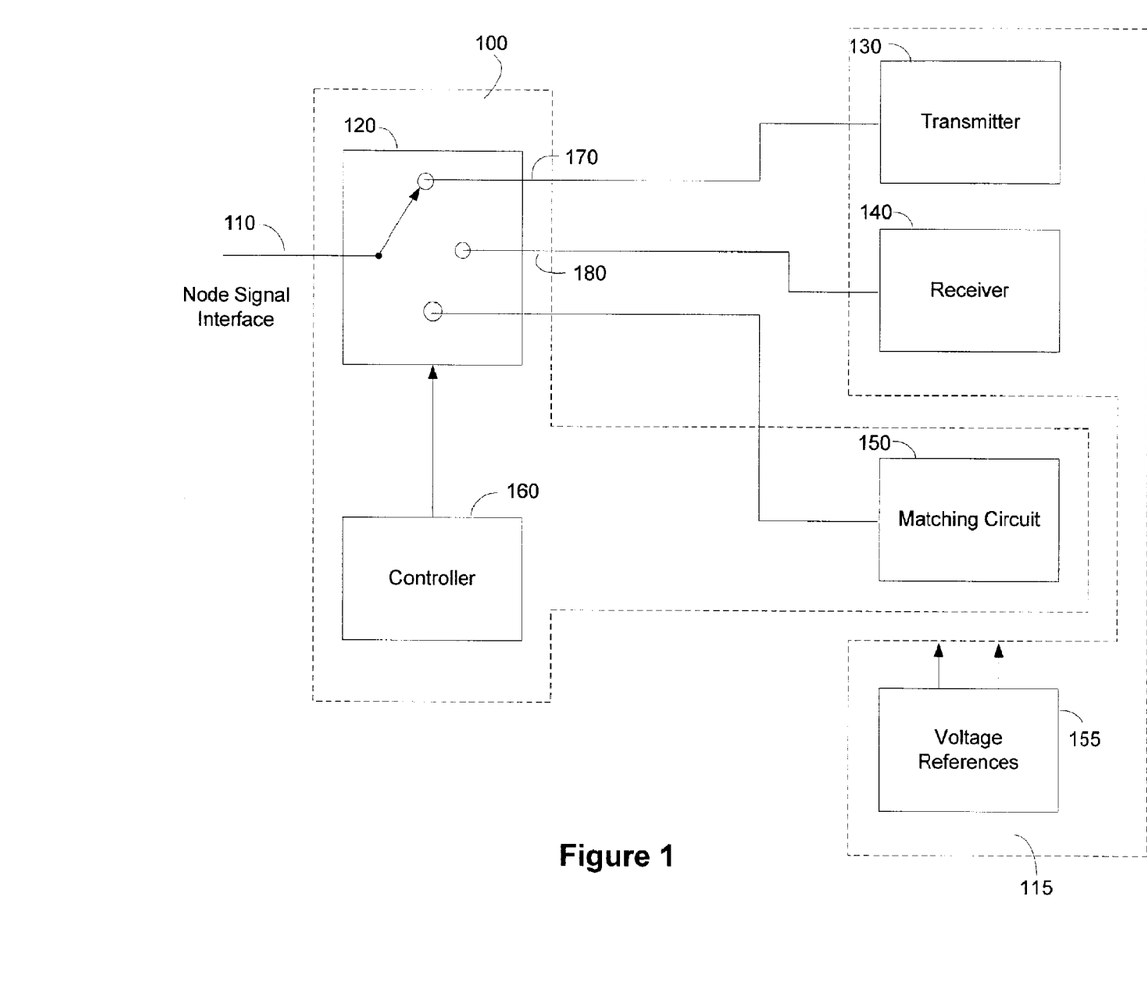
FIG. 1 shows a block diagram of an Impedance Control Device.

FIG. 1 shows a block diagram of an Impedance Control Device 100 having a switch 120, a impedance matching circuit 150 and a controller 160. Also shown is a node 115 which includes a transmitter 130, a receiver 140 and a voltage reference 155. A network is connected through a signal interface 110 and the switch 120 to a node 115. With the switch 120 set to connect the transmitter 130 to the signal interface 110 (the switch 120 in the position shown in FIG. 1), the impedance at the signal interface 110 looking back into the switch 120 is preferably matched to the impedance looking in the opposite direction (i.e., away from the switch 120 and into the network). This impedance can be 50 Ohms, 75 Ohms, or any other impedance value, typically depending upon the impedance of the cable or wire connected to the network. The position of the switch 120 is selected by a controller 160. The controller 160 determines whether the node 115 is in transmit and receive mode and selects the position of the switch 120 accordingly. The controller 160 also detects changes in the power applied to the node 115 or detects other events that may cause the transmitter or receiver circuits to deactivate, such as a node reset event. When an event is detected, the controller 160 selects the position of the switch 120 corresponding to a matching circuit 150 appropriate to the detected event.

Figure 2:
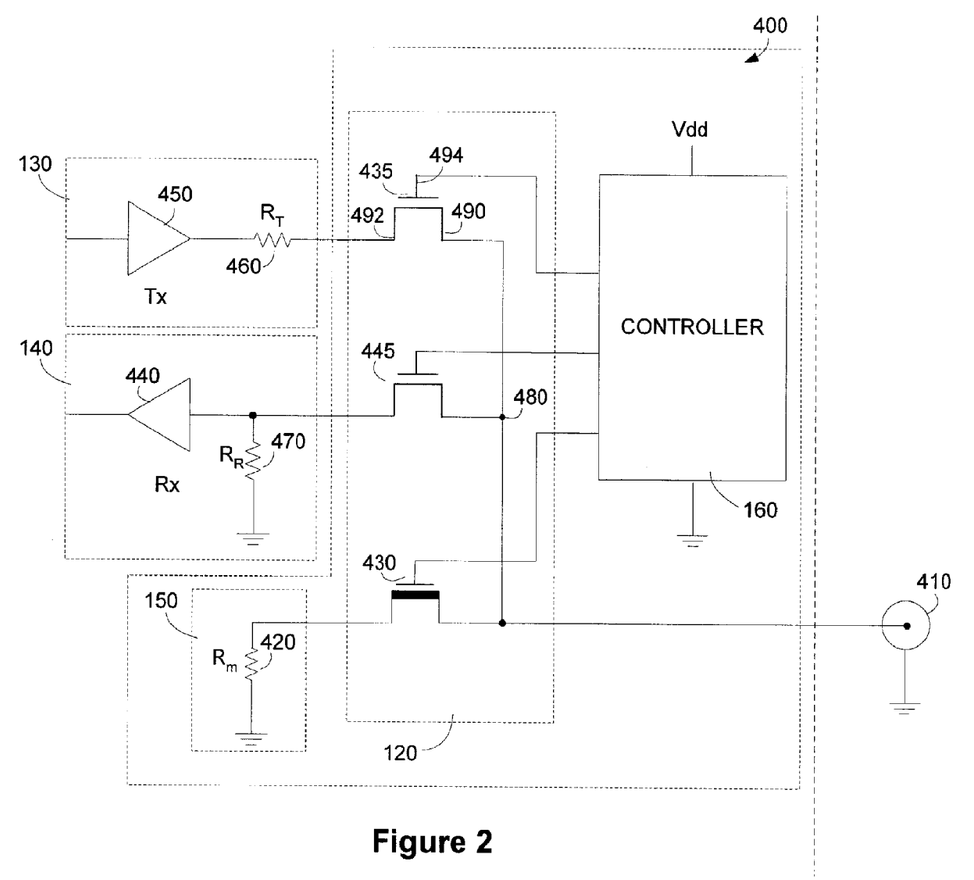
FIG. 2 shows an embodiment with a matching impedance connected during power off.

FIG. 2 shows an Impedance Control Device 400 coupled to a device interface 410, such as a connector. The Impedance Control Device 400 includes the multi-position switch 120, controller 160, and matching circuit 150 of FIG. 1. The Impedance Control Device 400 is coupled to the transmitter 130 and the receiver 140. The device 400 provides a predictable impedance to a node (not shown) coupled to the device interface 410 during power off. When a loss of power is detected, a switch 430 within the switch 120 connects an impedance 420 to the device interface 410 to provide a predictable impedance as the power is removed from the transmitter 130 and/or receiver 140. The impedance 420 may be implemented as either a resistance or a complex impedance. The switch 430 maintains a connection to the impedance 420 as long as the power remains off.

A transmitter amplifier 450 having a predetermined output impedance, for example, 75 Ohms in the case of a coaxial cable channel, is connected to the device interface 410 by a switch 435 within the switch 120 when the node is transmitting. A receiver amplifier 440 having a predetermined input impedance, also 75 Ohms, is connected to the device interface 410 by a switch 445 when the device is receiving. The impedance presented during transmission and reception is a combination of the intrinsic impedance of the amplifiers 440, 450 and a series resistance 460 or a shunt resistance 470 to produce the desired total impedance. The impedance during transmission and reception takes into account the non-zero resistance of the switches 435, 445. Thus, in general, the active circuit impedance will be less than the desired 75 Ohms by an amount equal to the resistance of one of the switches 435, 445. The switches 435, 445 preferably have equal resistance. Generally, the receiver amplifier 450 is connected to the device interface 410 except when the node connected to the device interface 410 is transmitting. When power is removed from the node, the switch 430 makes a connection to an matching impedance 420, also 75 Ohms.

The switches 430, 435, 445 can be constructed using transistors. For example, the switch 435 can be a field effect transistor (FET) connected with a first lead 490 connected to a common terminal 480, a second lead 492 connected to the series resistance 460. The gate 494 on the FET is used to turn the transistor on (i.e., reduce the resistance between the first lead 490 and the second lead 492). In one embodiment, the transmitter amplifier 450 and receiver amplifier 440 are connected through transistors 435, 445 that require positive bias on the gate to turn on the transistor 435, 445. The matching impedance 420 connects through a transistor 430 that uses a negative bias to turn off the transistor 430. When power is removed, the negative bias is not generated and the gate voltage returns to zero volts and the transistor 430 conducts, thereby connecting the matching impedance 420. In one embodiment, this transistor 430 can be implemented with a depletion mode MOSFET or other semiconductor device that conducts when no gate bias is present.

In another embodiment, when the controller 160 detects an event during which power remains, but the active circuitry is deactivated, such as during a reset event, the switch 120 selects the matched impedance 150 for the duration of the event. At the end of the event, the switch 120 returns to the state in which either the receiver 140 or transmitter 150 is selected, as appropriate.

In yet another embodiment, when an event is detected, the switch 120 selects the matching circuit 150. In this embodiment, the matching circuit 150 has an impedance that is variable starting from an impedance that is equal to or similar to the impedance of the node when it is "on" and slowly changing to an impedance that is equal to or similar to the impedance of the node when it is "off", or changing from "off" to "on".

The rate of the slowly varying signals is dependent on the speed of adaptation of the network. The total transition time for changing the impedance can range from microseconds to minutes. The transition time can be different for the power up, power down, and event conditions. For example, the power down transition can take many seconds, while the power up transition can take microseconds.

As noted with regard to FIG. 2, the switch 120 can be implemented with field effect transistors (FETs) where one terminal of each FET is connected to a common point and the other terminal is connected in series with each of the devices and the FETs are controlled to enable one FET at a time.

Figure 3:
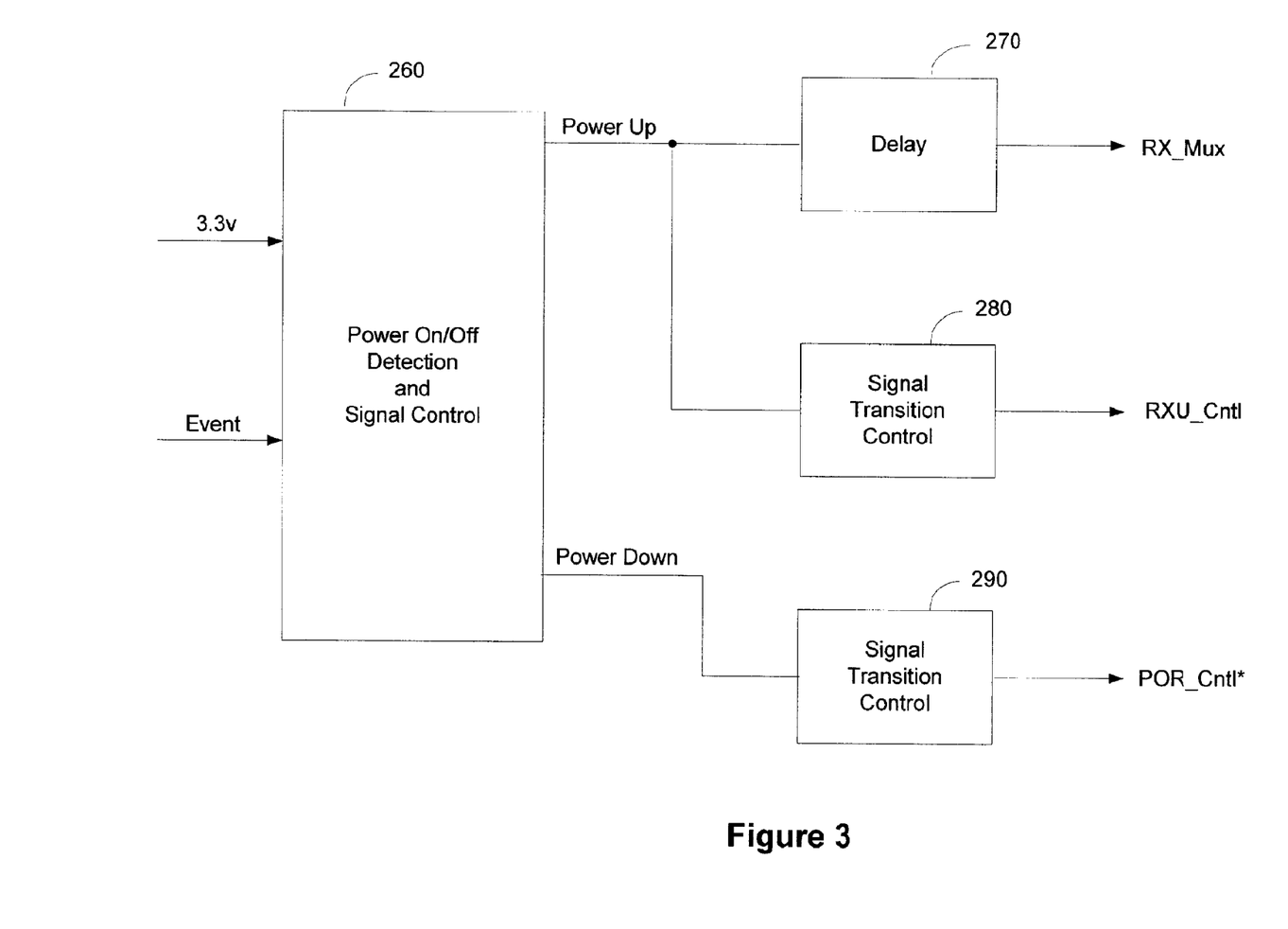
FIG. 3 shows a block diagram of a circuit to control the switches connected in series with circuit elements used to achieve impedance control at the node interface.

FIG. 3 shows a block diagram of a circuit to control the switches connected in series with circuit elements used to achieve impedance control at a node interface. Power on/off detection and signal control 260 detect the application or removal of power to the node by monitoring, for example, the 3.3-volt power supply of the node. When power is applied, signal control 260 asserts the power up signal. When power is removed, signal control 260 asserts the power down signal. Additionally, the signal control 260 is responsive to an event signal, such as device reset, and can initiate the power up or power down signals in response.

The power up signal passes through delay 270 to control RX_MUX, the signal used to select the receiver switch driving signal. The delay interval defines the period of time that RX_MUX selects the RXU_Cntl signal (varying voltage) to drive the switch. After the delay interval expires, RX_MUX selects the RX_Cntl (digital level) signal to drive the switch in the normal transmit/receive mode.

Signal transition control 280 creates a slow varying signal in response to the power up signal to produce RXU_Cntl, which drives the receiver switch to slowly turn on the switch and vary the resistance in series with the receiver circuit.

Signal transition control 280 can be an R-C network that creates an exponential voltage on a capacitor. Alternatively, signal transition control can be a constant current source that produces a substantially linear voltage across a capacitor. Signal transition control can be designed to discharge the capacitor quickly, and immediately change the output voltage level, when the input signal is deactivated, or to provide a slow transition in both directions of input signal transition.

Signal transition control 290 creates a slow varying signal in response to the power down signal to produce POR_Cntl*, which drives the matched impedance switch to slowly turn on the switch and vary the resistance in series. The power down signal can be an active low signal so that the inactive state maintains a voltage on a capacitor, thus storing energy. When the active-low power down signal is asserted, POR_Cntl* can be asserted to immediately turn on the matched impedance switch, then slowly drop the signal voltage to turn off the switch and increase the effective impedance at the node interface.

In one embodiment, the matched impedance is switched to the node interface upon power removal, then after transitioning to a high impedance and the other network nodes adapt to the new multipath environment, the un-powered node can be removed without a disruption in the multipath environment of the network. How the RX_MUX, RXU_MUX, and POR_Cntl* signals are used is discussed in further detail below with regard to FIG. 6.

Figure 4:
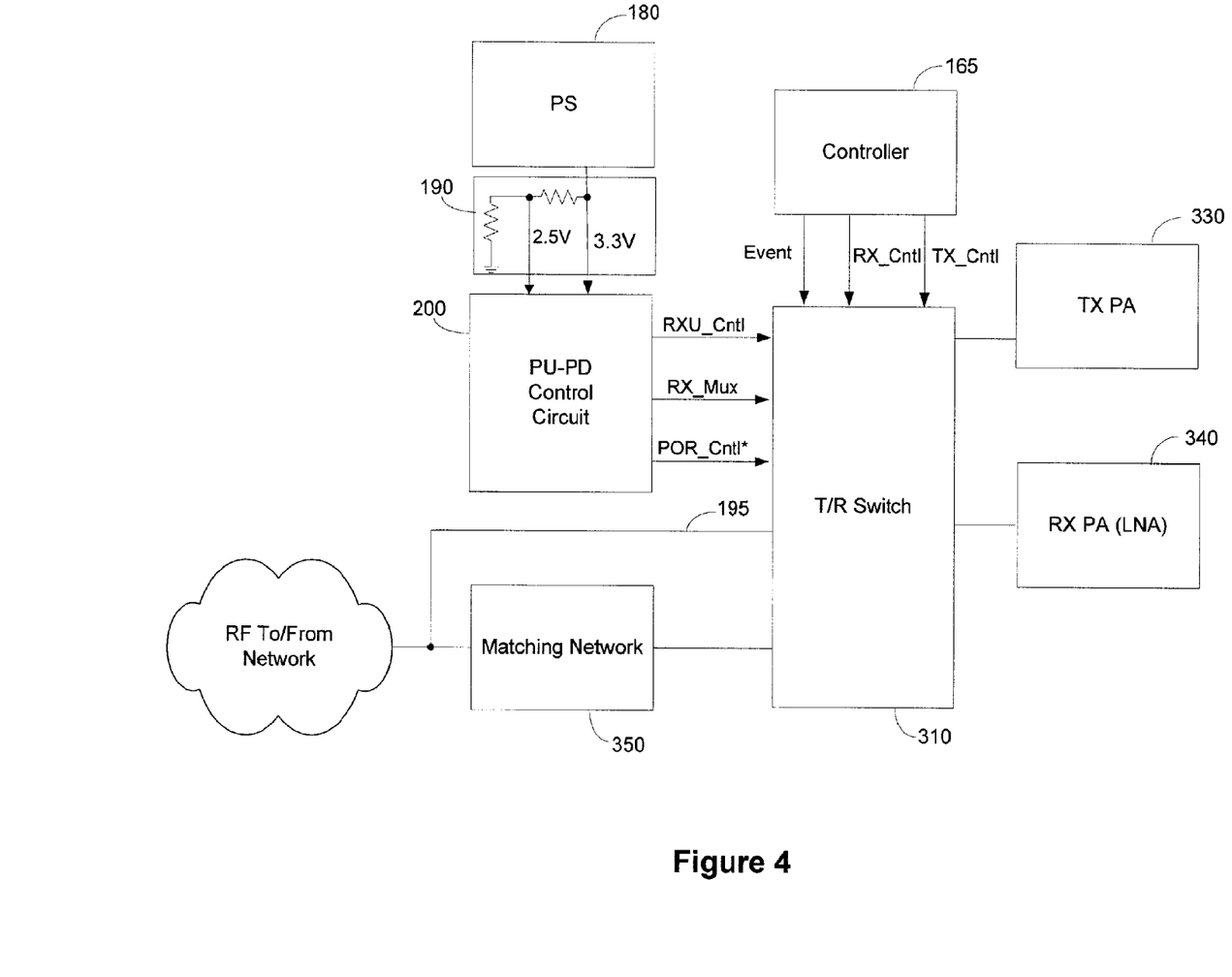
FIG. 4 illustrates another embodiment of an impedance control system.

FIG. 4 illustrates another embodiment of an impedance control system having a power supply 180, a voltage divider 190, a power up/power down (PU/PD) control circuit 200, a controller 165, a transmit/receive (T/R) switch 310, a transmit power amplifier (TX PA), a receive low noise amplifier (RX LNA) and a matching network 350. In accordance with the embodiment shown in FIG. 4, when power is applied, a first voltage of 3.3 volts and a second voltage of 2.5 volts are presented to the PU/PD control circuit 200. The 2.5 volt power source is the voltage divider 190. The PU/PD control circuit 200 outputs three signals, RXU_Cntl, POR_Cntl, and RX_MUX to the T/R switch 310. These signals provide control to the switch as will be explained in greater detail below. The matching circuit 350 is placed in series between the network and the T/R switch 350. A second RF path 195 from the network is provided directly to the T/R switch 310. The second RF path 195 is connected through the T/R switch 310 to either the TX PA 330 or the RX LNA 340, as will be explained in greater detail below. The determination as to whether the network is connected to the TX PA 330, the RX LNA 340 or through the matching network 350 is controlled by the controller 165.

Figure 5:
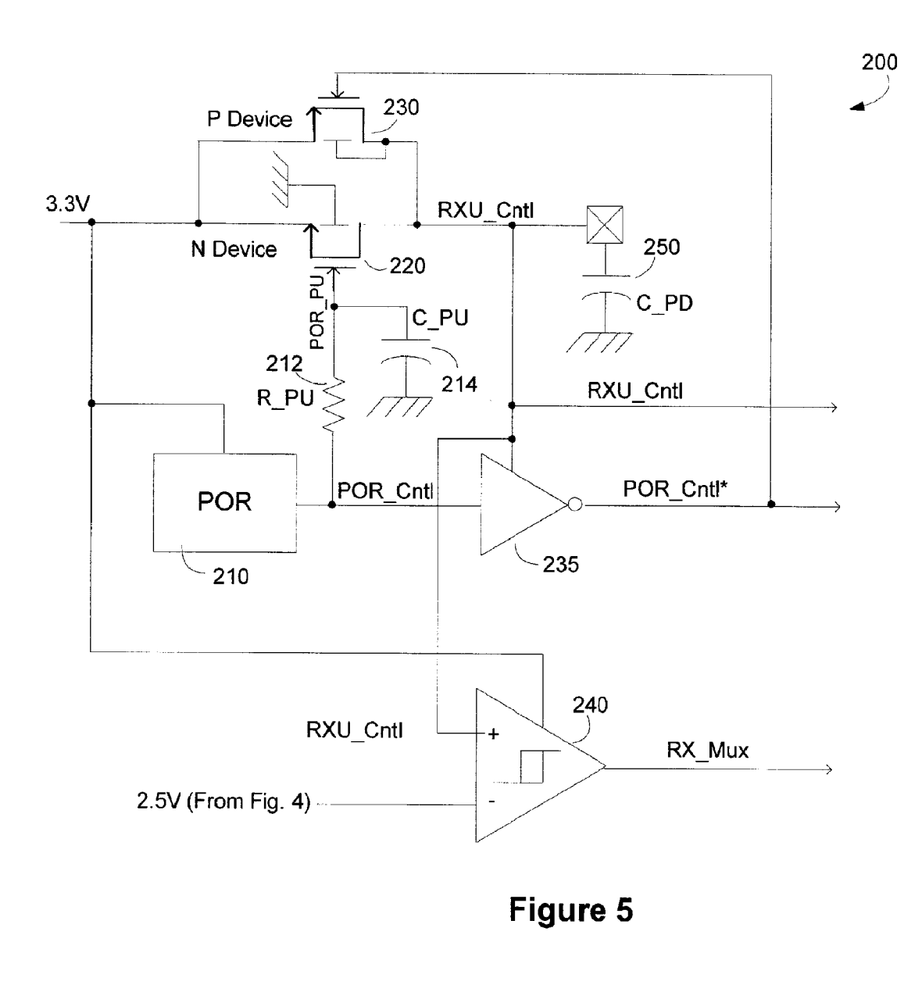
FIG. 5 shows a power up/power down (PU/PD) control circuit.
Figure 6:
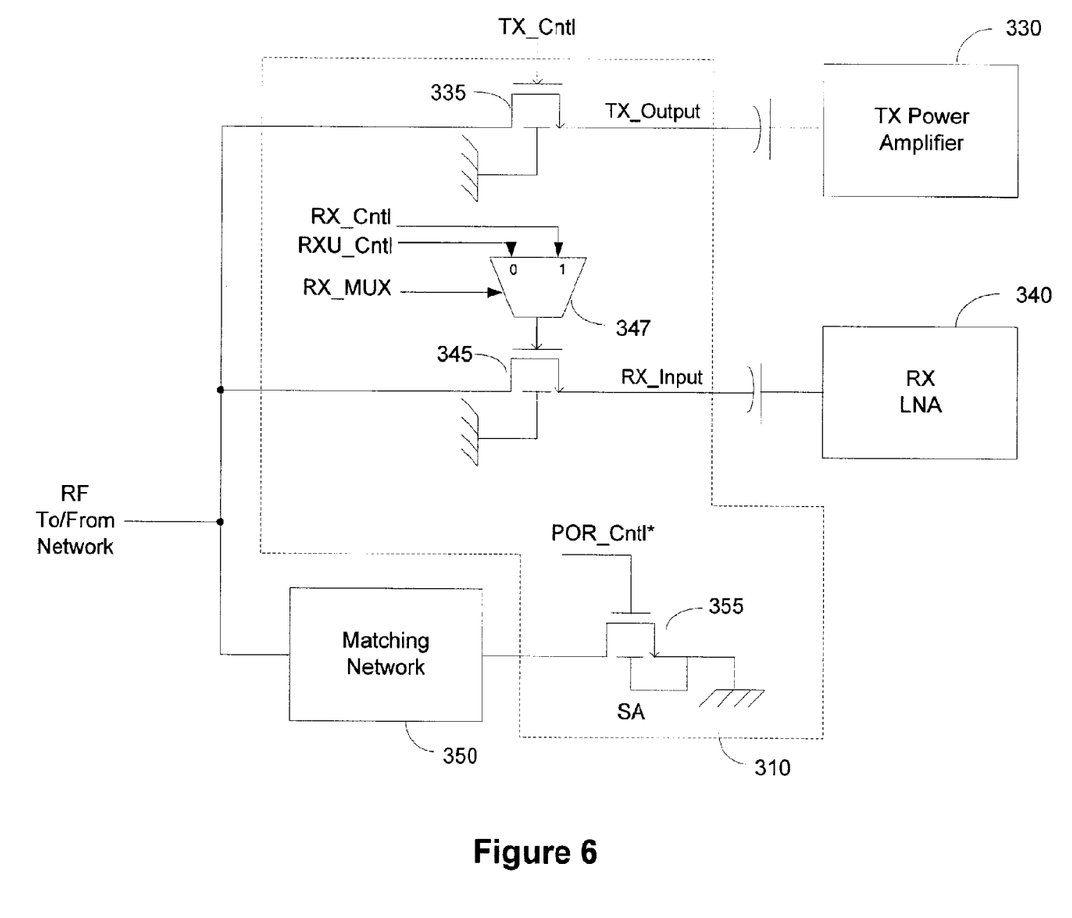
FIG. 6 shows a transmit/receive (T/R) switch.

Referring now to FIG. 5, an example of the details of the PU/PD control circuit 200 is shown. FIG. 6 illustrates the details of one embodiment of the T/R switch 310 that is controlled by the PU/PD control circuit 200 of FIG. 5. A Power On Reset Block 210 (POR) shown in FIG. 5 detects the transient of the power supply coming up from 0 to full operating power (vdd) or down from vdd to 0. Alternatively, the POR 210 can detect a transient on the power supply that is indicative of a power transition.

The POR 210 generates a signal entitled "POR_Cntl". The POR_Cntl signal is initially in the logical "0" state (inactive) during a power up transition (i.e., when power is initially applied). The POR_Cntl signal is coupled to the input of an inverter 235 to create a signal entitled "POR_Cntl*". POR_Cntl* is the logical inverse of POR_Cntl, however, when power is first applied, the inverter 235 does not have power and the output of the inverter 235 will remain low for some period of time. Power is supplied to the inverter 235 by the signal RXU_Cntl. As will be seen further below, the RXU_Cntl is connected indirectly to the 3.3 volt power supply line provided by the power supply 180 and rises more slowly then the 3.3 volt line directly from the power supply 180.

POR_Cntl* is coupled to a switch 355 shown in FIG. 6. When the voltage of POR_Cntl* is low, the switch 355 will be in a high impedance state (the switch is turned off). Thus, the matching network 350 shown in FIGS. 3 and 1B is not connected to the network. As shown in FIG. 5, the power supply 180 provides 3.3 volts to the circuit 200, but it will be understood by those skilled in the art that other voltages would also be appropriate. As noted above, RXU_Cntl is coupled to the 3.3 volt power supply line as well, but not directly. Rather, RXU_Cntl is coupled to the 3.3V power supply line through either an FET 220 or an FET 230. In addition, a capacitor 250 is provided on the RXU_Cntl line. The capacitor 250 will cause the voltage on RXU_Cntl to rise relatively slowly compared to the voltage on the 3.3 volt power supply line. The signal RXU_Cntl is also coupled to the positive input to a comparator 240. Power to the comparator 240 is applied directly from the 3.3 volt power supply 180. The negative input to the comparator 240 is coupled to the 2.5 volt output of the voltage divider 190. Once RXU_Cntl charges up to a level that is greater than the 2.5 volt line provided to the PU/PD control circuit 200 by the voltage divider 190, the output RX_MUX transitions from a logical "0" level to a logical "1".

The output RX_MUX of the comparator 240 is coupled from the comparator 240 shown in FIG. 5 to the "select" input of a multiplexer 347 shown in FIG. 6. The RXU_Cntl signal is coupled from the PU/PD control circuit 200 of FIG. 5 to the "0" input of the multiplexer 347 shown in FIG. 6. RXU_Cntl is increasing gradually from 0 volts to a full vdd level depending on the C_PD value and leakage current at this point. Up until that point, RX_MUX is at a logical zero. RX_MUX being at a logical "0" will cause the "0" input to be coupled to the gate of the FET 345 and a logical "1" will cause the multiplexer 347 to couple the signal coupled to the "1" input to the gate of the FET 345. Accordingly, RXU_Cntl, which is provided from the controller 165 (shown in FIG. 4) and coupled to the "0" input of the comparator 240, is passed through to the gate of the FET 345. The signal applied to the gate of the FET 345 will keep the FET 345 initially at a high impedance and will slowly turn the FET 345 on as RXU_Cntl rises. When RXU_Cntl gets above the 2.5 volt reference voltage the FET 345 will be fully on. In addition, as RXU_Cntl rises above the 2.5 volt level, the comparator 240 will switch and RX_MUX will rise causing the multiplexer 347 to couple RX_Cntl to the gate of the FET 345.

The signal POR_Cntl which is generated by the POR circuit 210 shown in FIG. 5 is at a high voltage (3.3 volts in the present embodiment) when the POR circuit 210 detects power. Resistor R_PU 212 and C_PU 214 create a slow changing voltage at node POR_PU at the gate of the FET 220 shown in FIG. 5, which controls the N device 220. When vdd rises from 0 to 3.3 volts, POR_Cntl is driven high and the N device 220 turns on. POR_Cntl* (the logical complement of POR_Cntl) is initially at low voltage level, since power is applied to the inverter 235 by RXU_Cntl. POR_Cntl* is coupled to the P device 230 which turns on and starts charging the capacitor C_PD 250. By doing this, the signal RXU_Cntl is now at high level, '1', that is, full vdd level, which can be 5V, 3.3V, 1.8V, 1.2V, or 1V or other voltage.

When power is removed, the POR circuit 210 drives its output, POR_Cntl, to a low voltage level. This causes the N device to turn off. POR_Cntl* is then driven to a high voltage by the inverter 235. POR_Cntl* turns off the P device 230, isolating the already charged tank capacitor C_PD 250. By doing this, the signal RXU_Cntl remains at a high voltage level (full vdd level) and decreases gradually depending on the value of the capacitor C_PD 250 and the leakage current at this circuit node. RX_MUX drifts to a low voltage level no matter what is the state of RXU_Cntl is because the comparator 240 generating the RX_MUX is powered by the 3.3 volt power supply which has been powered down. The impedance of the RX LNA 340 is now high because the power to the RX LNA 340 is off. Furthermore, because POR_Cntl* is held at a high voltage, the FET 355 is held on and so the matching network 350 is coupled through the FET 355 to the network.

As the voltage of POR_Cntl drops, the impedance through the FET 355 will start to increase and will change gradually from low impedance to high impedance.

It should be noted that the switch 310 can be implemented with individual switches in series with each of the switched components, each switch with a separate control signal. Any of the components can be connected to the common switch node using the corresponding control signal.

TX power amplifier 330 is connected to the network through the switch through FET 335 when the TX_Cntl signal is at a high voltage. TX_Cntl is generated by the controller 165 shown in FIG. 4. It should be noted that any other switching device responsive to the control signal TX_Cntl may be used rather than the FET 335 shown in FIG. 6.

During normal operation, RX_MUX will be high, and so the multiplexer 347 will couple RX_Cntl to the gate of the FET 345. RX LNA 340, or any other receiver component, is connected to the network through FET 345. As noted above, FET 345 is controlled by either RX_Cntl (a digital signal) or RXU_Cntl (a varying level signal).

Power Shutdown Modes

These modes are designed for the case when the power supply is available, but it is desired to minimize device operating current.

Complete shutdown mode (C) is as complete a shutdown as possible while power is still being applied to the device. When shutdown mode C is enabled all active devices of the affected IC are disabled with the exception of the T/R switch, which is directed to connect the RF I/O port to the passive matching circuit. This mode is preferred for critical power conservation, such as battery backup operation for lifeline services.

Partial shutdown mode (P) is a partial shutdown mode. When shutdown mode P is enabled all transmit active devices are disabled. However, receive active devices remain enabled, and the T/R switch is directed to connect the RF I/O port to the receive path. This mode is recommended for all other power down requirements, such that power on and power off (sleep) states will have minimal impact to the system.

What is claimed is:

1. A networked network device for use in a wired communication channel with impedance control at the device interface comprising:

a transmitter with a predetermined impedance;

a receiver with a predetermined impedance;

a matched impedance;

a multi-position switch capable of connecting a common terminal to one of the transmitter, receiver, and matched impedance, the common terminal connected to the communication channel;

a control for the switch that is responsive to detecting application of power and removal of power and controls the switch to slowly connect the receiver to the common terminal when power is applied and to connect the matched impedance to the common terminal when power is removed then slowly disconnect the matched impedance, wherein the multiposition switch is comprised of three independently controlled switches and the control produces a power up signal in response to application of power and further comprising a delay circuit responsive to the power up signal and a signal selector wherein a receiver switch connection is controlled by a slowly varying signal before the delay expires and by a digital control signal after the delay expires.

* * * * *